United States Patent Office 3,300,643
Patented Jan. 24, 1967

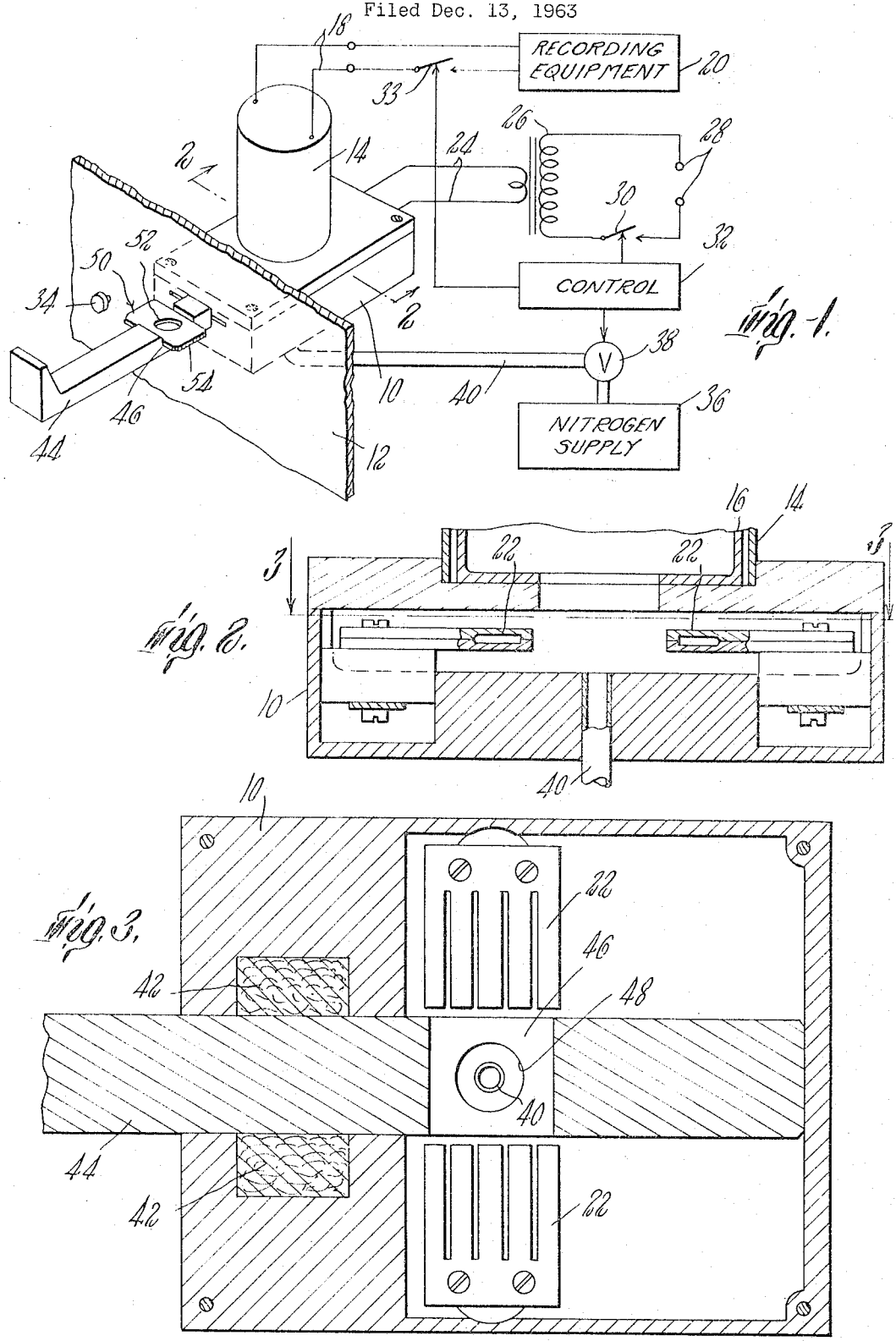

3,300,643
THERMOLUMINESCENT RADIATION DOSIMETER READOUT APPARATUS USING NITROGEN GAS IN THE READOUT CHAMBER
Richard C. McCall, Watertown, Mass., assignor to Controls for Radiation, Inc., Cambridge, Mass., a corporation of Massachusetts
Filed Dec. 13, 1963, Ser. No. 330,374
9 Claims. (Cl. 250—71.5)

This invention relates to radiation dosimetry and more particularly to methods and apparatus for reading radiation dosimeters of the thermoluminescent type.

Certain well-known crystalline substances, such as quartz, when exposed to X-radiation or radioactivity, give off light when they are heated. This release of light, or luminescence, is caused by the thermal release of electrons from positions of "metastability" for return to the ground state. A thermoluminescent material of exceptionally good radiation sensitivity is lithium fluoride. This material, when exposed to X-radiation dosages in the order of a few milliroentgens (mr.), will release detectable amounts of photon radiation in the visible frequency spectrum. However, it has been difficult in commercially economic arrangements to detect this low level light output due to the presence of extraneous signals, i.e., noise. Several of the sources of system noise, such as the photomultiplier dark current, can be reduced through proper design of the phosphor readout device and appropriate selection of readout cycles.

A specific object of this invention is to substantially reduce another source of extraneous signals which occur in connection with the readout of dosimeters of the thermoluminescent type.

When undosed lithium fluoride phosphors (that is, phosphors which have not been exposed to activating radiation) are heated to readout temperatures in air, photomultiplier outputs in excess of four hundred units are generated in response to the released radiation. These outputs are produced by extraneous sources (as the phosphors were undosed), and thus such sources provide a substantial contribution to system noise. I have found that the same undosed phosphors, when heated for readout in an environment from which oxygen is excluded and preferably in a pure nitrogen environment, produce photomulitplier outputs in the order of fifteen units. This substantial reduction in extraneous (background) signal magnitude enables greatly improved sensitivity of radiation dosage measurements to be achieved. In addition to the reduction in the magnitude of the extraneous signals, an additional improvement in uniformity of output is also achieved where phosphors are heated to readout temperature in pure nitrogen, there being variation in the outputs from a particular undosed phosphor heated in air in excess of one hundred percent, while the corresponding set of outputs from that phosphor when heated in nitrogen varied less than twenty percent. Through the substantial reduction of this extraneous signal source, a marked improvement in thermoluminescent dosimetry has been provided.

Other features, objects and advantages of the invention will be seen as the following description of a preferred embodiment of the invention progresses, in conjunction with the drawing, in which:

FIG. 1 is a schematic diagram of thermoluminescent dosimeter readout apparatus, constructed in accordance with the invention;

FIG. 2 is a sectional view of the readout chamber taken along the line 2—2 of FIG. 1, showing the planchet carrying slide in withdrawn position; and FIG. 3 is a sectional view taken along the line 3—3 of FIG. 2, showing the planchet carrying slide in readout position.

The dosimeter readout apparatus shown in FIGS. 1–3 includes a light tight, phosphor crystal heating chamber 10, which is mounted within a casing 12 (only a portion of the front wall thereof being shown). Mounted on top of the heating chamber 10 is a photomultiplier tube housing 14 in which is disposed a photomultiplier tube 16 positioned for viewing the interior of chamber 10. Terminals 18 connect the photomultiplier tube to circuitry 20 for the recording of radiation sensed by the photomultiplier tube.

Mounted within chamber 10 are two sets of electrical contacts 22 (FIGS. 2 and 3) that are spaced apart so that they are positioned on opposite sides of the area of surveillance of the photomultiplier tube. These sets of contacts are connected by means of conductors 24 (FIG. 1) to step-down transformer 26 which is connected to an energizing source at terminals 28. Application of power to the transformer 26 is controlled by switch 30. Control unit 32 includes a timing unit which controls switch 30 and readout circuitry switch 33, and its timing cycle is initiated by push-button 34, mounted on the front of casing 12.

In addition, there is provided a source 36 of oxygen-free gas (a gas without contaminating free oxygen gas) maintained at a pressure at least slightly above atmospheric (in the order of two pounds p.s.i.g.). The gas, in the presently preferred embodiment, is pure nitrogen. Other oxygen-free gases found to provide improved results include carbon dioxide and the inert gas argon. Source 36 is connected through valve 38 and conduit 40 to the heating chamber 10. Valve 38 may be manually controlled or may be operated by control unit 32 to control the supply of gas in synchronism with the readout cycles.

The heating chamber 10 is light tight (to minimize photomultiplier dark current) but not gas tight. As indicated in FIG. 3, there is provided a set of felt block seals 42 which surround planchet carrying slide 44 and provide a light tight seal between that movable slide and the interior of the heating chamber. Thus the interior of the chamber is shielded from external light at all times. However, the seals 42 pass gases so that all oxygen may be flushed out of the chamber prior to readout.

Slide 44 includes a planchet locating portion in the form of rectangular recess 46 with cylindrical aperture 48 centrally located in recess 46 (FIG. 3). Readout planchet 50 is of flat sheet material of relatively high electrical resistivity (a preferred material being stainless steel) and is dimensioned to fit in recess 46 as shown in FIG. 1. The thermoluminescent phosphor crystals (preferably lithium fluoride) which are to be heated in a readout operation are placed in depression 52 in a thin layer, and the planchet is positioned on slide 44. The slide with the planchet so positioned is then pushed into the heating chamber to the position shown in FIG. 3 (planchet not shown) in which the planchet edges 54 are located in electrical circuit completing engagement with the spaced contact elements 22. Normally during this operation, the chamber is filled with the pure nitrogen to insure that all oxygen is flushed out.

After the planchet has been positioned in an electrical circuit between contacts 22, 22, push-button 34 is depressed to initiate a heating operation. This heating operation is carried out in an oxygen-free environment. A preferred sequence is to apply the electric current for a period of ten seconds so that the planchet is heated to a temperature of approximately 300° C., with the phosphor material being heated to a temperature of 210° C. The photomultiplier tube is connected in circuit to the recording apparatus 20 in synchronism with the application of heating energy to the planchet 50 and maintained in circuit for fifteen seconds in the readout operation.

This heating of the prosphor crystals produces luminescence which is a direct function of the radiation to which the phosphor crystals had been exposed and thus an accurate indication of the radiation dosage is provided Extraneous luninescence, believed due to interaction of oxygen with the phosphor crystal lattice structure, is eliminated, thus reducing the background signal and providing more uniform response. Upon completion of the heating cycle, the switch 30 is opened by control 32. Slide 44 may be then pulled out to withdraw the planchet so that the planchet and readout phosphor may be removed and another planchet with phosphor placed in the slide for a readout operation.

The read-out phosphor crystals are then annealed in an oxygen-containing atmosphere, being heated to 400° C. for one hour and then maintained at 75° C. for twenty-four hours so that the crystals are placed in uniform condition for future radiation dosimetry use.

This cycle of reading out the thermoluninescent phosphor in an oxygen-free atmosphere and then annealing the read-out phosphor in an oxygen-containing atmosphere provides a significant reduction in extraneous signal produced during the readout operation and thus significantly improves the accuracy and dosage range over which such radiation dosimeters may be used.

While a preferred embodiment of the invention has been shown and described, various modifications thereof will be apparent to those skilled in the art. Therefore, it is not intended that the invention be limited to the disclosed embodiment or to details thereof, and departures may be made therefrom within the spirit and scope of the invention as defined in the claims.

What is claimed is:

1. A method of radiation dosimetry comprising the steps of heating a phosphor previously exposed to radiation, flowing an oxygen-free gas over said phosphor throughout the heating process, and sensing the amount of radiation released by said phosphor as a result of said heating process.

2. The method as claimed in claim 1 wherein said phosphor is lithium fluoride.

3. The method as claimed in claim 1 wherein said oxygen-free gas is nitrogen.

4. A method of radiation dosimetry comprising the steps of heating a lithium fluoride phosphor previously exposed to radiation to a predetermined readout temperature in a nitrogen atmosphere, and sensing the amount of radiation released by said phosphor as a result of said heating process.

5. Radiation dosimetry apparatus comprising means to dispose a thermoluminescent lithium fluoride phosphor in sensing relation to a radiation sensor, means to apply heat to said phosphor in a readout operation, and means to surround said phosphor with nitrogen throughout said readout operation.

6. Thermoluminescent radiation dosimeter readout apparatus comprising a chamber, a radiation sensor disposed in scanning relation to said chamber, means for introducing exposed phosphor material into said chamber, means for flowing an oxygen-free gas into said chamber for intimate contact with the phosphor disposed in said chamber, and means for heating said phosphor while said gas is in intimate contact therewith in a dosimeter readout operation.

7. Apparatus for reading out thermoluminescent dosimeters of lithium fluoride crystals comprising a chamber, a radiation sensor disposed in scanning relation to said chamber, a source of pure nitrogen, means coupling said source to said chamber, valve means in said coupling means for controlling the flow of nitrogen to said chamber, two sets of spaced electrical contacts in said chamber, planchet support means for positioning a high resistance phosphor carrying element in electrical circuit between said sets of contacts, first switch means for energizing said sets of contacts, second switch means for connecting said sensor to recording circuitry and common control means for controlling the operation of said valve and said first and second switch means.

8. Thermoluminescent radiation dosimeter readout apparatus comprising a chamber having a light-tight, gas transmitting seal, a photomultiplier disposed in scanning relation to said chamber, means for introducing exposed phosphor material into said chamber past said seal, gas conducting means communicating with said chamber for flowing an oxygen-free gas into said chamber for intimate contact with the phosphor disposed in said chamber, and electric resistance circuit means for heating said phosphor while said gas is in intimate contact therewith in a dosimeter readout operation.

9. Apparatus for reading out thermoluminescent dosimeters of lithium fluoride crystals comprising a chamber having a light-tight, gas transmitting seal, a photomultiplier disposed in scanning relation to said chamber, a source of pure nitrogen, an orifice in the floor of said chamber, means coupling said source to said orifice, valve means in said coupling means for controlling the flow of nitrogen to said chamber, two sets of spaced electrical contacts in said chamber immediately above said orifice, a planchet supporting slide for introducing a high resistance phosphor carrying planchet into said chamber past said seal and positioning said planchet in electrical circuit between said sets of contacts, first switch means for energizing said sets of contacts, second switch means for connecting said sensor to recording circuitry and common control means for controlling the operation of said valve and said first and second switch means.

References Cited by the Examiner

UNITED STATES PATENTS 3,115,578  12/1963  Schulman _____ 250—71
3,141,973  7/1964  Heins et al. _____ 250—83

ARCHIE R. BORCHELT, *Primary Examiner.*